United States Patent [19]

Hagelbarger

[11] 3,787,836

[45] Jan. 22, 1974

[54] MULTITONE TELEPHONE DIALING CIRCUIT EMPLOYING DIGITAL-TO-ANALOG TONE SYNTHESIS

[75] Inventor: David William Hagelbarger, Morris Twp., Morris County, N.J.

[73] Assignee: Bell Telephone Laboratories, Incorporated, Berkely Heights, N.J.

[22] Filed: June 15, 1972

[21] Appl. No.: 263,215

[52] U.S. Cl. ........ 340/347 DA, 235/197, 179/90 K, 328/14

[51] Int. Cl. ........................................ H03k 13/02

[58] Field of Search ..........179/90 K, 340/347 DA, 235/152, 197, 92 FQ; 328/14, 187, 39, 42, 46

[56] References Cited

UNITED STATES PATENTS

| | | | |
|---|---|---|---|
| 3,119,071 | 1/1964 | Euler et al. | 328/46 X |
| 3,657,658 | 4/1972 | Kubo | 328/39 X |
| 3,671,871 | 6/1972 | Malm | 328/14 X |
| 3,514,775 | 5/1970 | Tripp | 340/347 DA |
| 3,464,018 | 8/1969 | Cliff | 328/187 X |
| 3,453,542 | 7/1969 | Hoffmann | 328/14 X |
| 3,654,450 | 4/1972 | Webb | 235/152 X |
| 3,641,442 | 2/1972 | Boucher | 328/187 |
| 3,349,230 | 10/1967 | Hartwell | 340/347 DA |

*Primary Examiner*—Charles D. Miller
*Attorney, Agent, or Firm*—C. S. Phelan

[57] ABSTRACT

A circuit is provided for generating combinations of digitally synthesized sinusoidal waveforms used for voiceband signaling in multitone telephone station sets. The circuit features plural variable frequency dividers which function under the control of the station set keyboard to divide a single digital master clock signal into predetermined sequences of multifrequency digital components which are shifted in phase predetermined amounts. The shifted sequences of components are summed in suitable proportions to form acceptable approximations of the multitone dialing waveforms.

5 Claims, 6 Drawing Figures

FIG. 6

TABLE OF RELATIVE PHASE INTERVALS FOR TWO CYCLES OF THE APPROXIMATED SINUSOIDAL WAVEFORMS - $n=6$, $m=2$

FREQUENCY - Hz

| PHASE NUMBER | 697 | 770 | 852 | 941 | 1209 | 1336 | 1477 |
|---|---|---|---|---|---|---|---|
| 0 | 15T | 14T | 13T | 11T | 9T | 8T | 7T |
| 1 | 15T | 14T | 12T | 11T | 8T | 8T | 8T |
| 2 | 16T | 13T | 13T | 12T | 9T | 8T | 7T |
| 3 | 15T | 14T | 12T | 11T | 9T | 8T | 7T |
| 4 | 15T | 14T | 13T | 11T | 8T | 7T | 7T |
| 5 | 15T | 13T | 12T | 12T | 9T | 8T | 7T |
| 6 | 15T | 14T | 12T | 11T | 9T | 8T | 7T |
| 7 | 15T | 14T | 13T | 11T | 8T | 8T | 8T |
| 8 | 16T | 13T | 12T | 12T | 9T | 8T | 7T |
| 9 | 15T | 14T | 12T | 11T | 9T | 8T | 7T |
| 10 | 15T | 14T | 13T | 11T | 9T | 8T | 7T |
| 11 | 15T | 14T | 12T | 11T | 9T | 8T | 7T |

$$T = \frac{1}{63.476} \text{ kHz}$$

MULTITONE TELEPHONE DIALING CIRCUIT EMPLOYING DIGITAL-TO-ANALOG TONE SYNTHESIS

BACKGROUND OF THE INVENTION

1. Field of the Invention

This invention relates, generally, to the field of telephony and, more particularly, to a tone generating circuit for a multitone telephone station set which employs digital-to-analog waveform synthesis.

2. Prior Art

The multifrequency, voiceband, dialing signals utilized in telephone station sets which provide multitone dialing service are currently being generated with analog circuitry. This circuitry is basically comprised of networks of inductor-capacitor (L-C) circuits which are tuned to different ones of the required dialing tones. Whenever a key is depressed on the station set, two corresponding L-C circuits are switched into resonant loops through electromechanical switches to generate the required pair of dialing tones.

Although this method of generating dialing tones has proved through field use to be satisfactory for most applications, it has a number of significant drawbacks. For example, one such drawback is that components having rather strict electrical values and low temperature sensitivity are needed to generate tones of the precise frequencies which are required in this type of station signaling. As a result, manufacturing costs are higher than would be expected because high quality elements are required to avoid the generation of erroneous or out-of-band dialing signals.

Another drawback lies in the bulky size of the inductors and capacitors which are required to implement the analog type of tone generating circuitry. Since the tuned circuits are required to resonate at relatively low voiceband frequencies, large electrical values, and correspondingly large physical sizes, for the elements of the tuned circuits are unavoidable. Consequently, the analog tone generating circuitry takes up an inordinately large space in the station set which can advantageously be put to a more productive use.

Still another drawback of the existing analog tone generating circuitry lies in the fact that the circuitry requires large amounts of power to operate, thereby limiting the number of multitone station sets which can be operated from existing central office battery facilities. Moreover, the present design of the tone generating circuitry precludes circuit miniaturization which could result in substantial savings in power consumption, because the large inductors and capacitors are not amenable to fabrication in integrated circuit form.

More recently, problems of size have become somewhat mitigated by the employment of resistance-capacitance (R-C) oscillators with key-selected impedances for causing oscillation at certain frequencies. However, the aforementioned considerations of strict electrical values and low temperature sensitivity are still present.

Digital circuits, which for the most part, do not require elements having strict electrical values or low temperature sensitivities, are capable of miniaturization, and usually require correspondingly lesser amounts of power to operate. Digital circuits have, in the past, been used for synthesizing frequency-shift-keying (fsk) signals in data transmission systems. In general, these circuits have been comprised of multistage digital shifting circuits which delay a square wave having the frequency of the desired fsk signal to provide a plurality of differently delayed replicas of the square wave. The differently delayed square waves are then summed to form a suitable approximation of the desired fsk waveform.

However, these circuits are not suitable for generating the dialing signals required in conventional multitone telephone systems for a number of reasons. One such reason is that these circuits require high frequency digital master clock circuits which have proved to be expensive to provide and operate in consumer telephone station sets. Another reason is that these circuits lack the simultaneous voiceband tone generation capabilities required in multitone telephone dialing systems. Still another reason is that these circuits, as they currently exist, are not compatible with the existing telephone plant.

Accordingly, it is an object of this invention to provide a digital tone generating circuit which is compatible with the existing multitone telephone plant.

It is a further object of this invention to provide a digital tone generating circuit which is capable of being implemented in miniaturized form.

It is yet another object of this invention to provide a digital tone generating circuit which requires significantly less power to operate than existing analog tone generating circuits.

SUMMARY OF THE INVENTION

This invention lies in a circuit for generating multifrequency combinations of digitally synthesized sinusoidal waveforms which are used for voice frequency signaling in multitone station sets. The circuit features plural frequency dividers which function under the control of a keyboard activated encoding circuit to divide a single digital master clock frequency into selected sequences of multifrequency digital components. Phase information as to which components of the selected sequences have already been generated is fed back to the variable frequency dividers to control the frequencies of the following components. The resulting sequences of components are then delayed and summed in suitable proportions to form acceptable approximations of the desired sinusoidal waveforms. Each such synthesized waveform has a frequency which is proportional to the sum of the frequencies of its digital components.

BRIEF DESCRIPTION OF THE DRAWINGS

FIG. 6 presents a table of the relative phase intervals for the synthesized sinusoidal waveforms which are generated in practice in a conventional multitone, telephone station set.

DETAILED DESCRIPTION OF THE INVENTION

Figure 1:
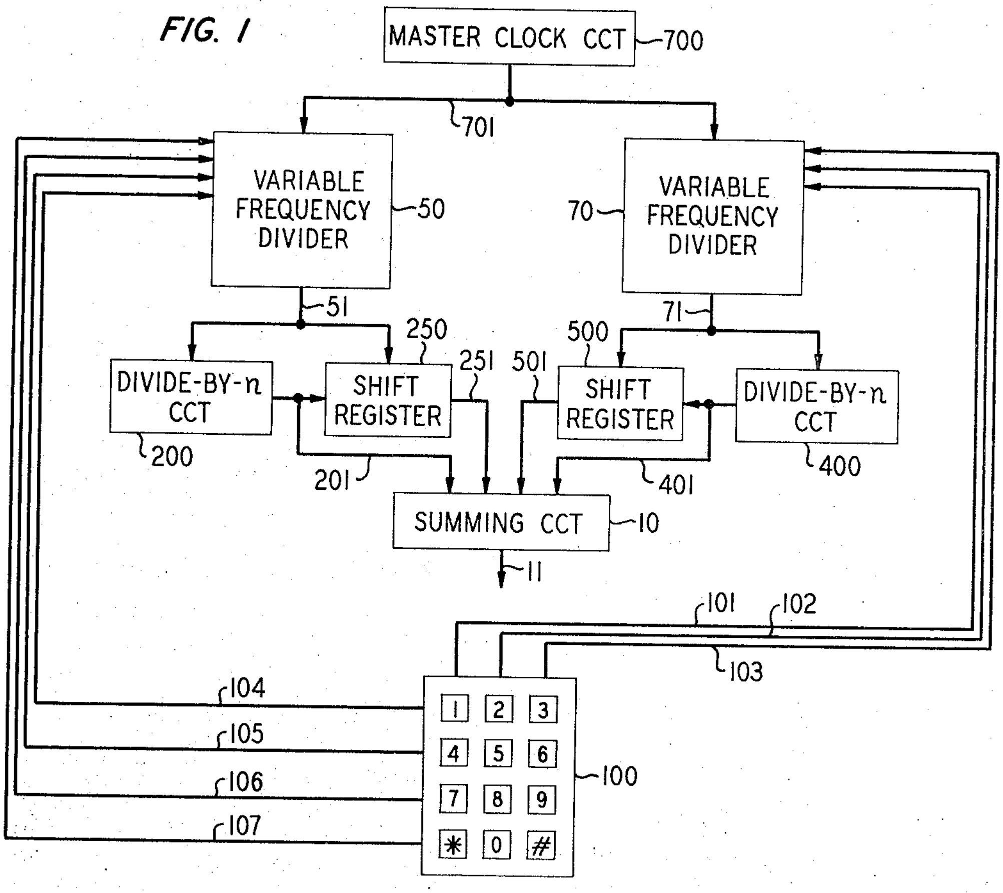
FIG. 1 depicts a schematic diagram of a basic embodiment of the tone generating circuit.

An advantageous application of the invention lies in a digital tone generating circuit which is shown in its most basic form in FIG. 1. The tone generating circuit is designed to provide digitally synthesized approximations of each of the twelve combinations of low and high frequency tones which are utilized for dialing signals in a standard 12-key multitone station set.

The tone generating circuit takes advantage of the fact that each of the twelve combinations of low and high frequency dialing tones can be represented by a different "2 out of 7" code word. Three "column" leads 101–103 and four "row" leads 104–107 are connected to a standard 12-key keyboard 100 in a manner such that each row lead indicates a particular frequency from the low frequency group and each column lead indicates a particular frequency from the high frequency group. The row leads are connected to the control inputs of a first variable frequency divider 50, and the column leads are connected to the control inputs of a second variable frequency divider 70. The dividers are advantageously of a type known in the art, one form of which will be considered in greater detail in connection with FIG 5.

The signal inputs of variable frequency dividers 50 and 70 are commonly connected through lead 701 to the output of a master clock circuit 700 which produces a digital signal having a frequency that is capable of being divided down to any of the three high frequencies or four low frequencies required for conventional multitone dialing service. Variable frequency divider 50 divides the master clock frequency down to a digital signal having a frequency which is proportional to a particular tone from the low frequency group and which depends upon the control information coupled to the divider on row leads 104–107. Variable frequency divider 70 divides the master clock frequency down to a digital signal having a frequency which is proportional to a particular tone from the high frequency group and which depends upon the control information which is coupled to divider 70 on column leads 101–103.

When a key is depressed on keyboard 100, a digital signal having a frequency which is a predetermined integral multiple of a corresponding frequency from the low frequency group is available on output lead 51 of variable frequency divider 50; and a digital signal having a frequency which is a predetermined integral multiple of a corresponding frequency from the high frequency group is simultaneously available on output lead 71 of variable frequency divider 70. The low frequency digital signal produced on output lead 51 of variable frequency divider 50 is then fed into divide-by-*n* circuit 200. Divide-by-*n* circuit 200, many forms of which are well known in the art, divides the repetition period of each pulse of the low frequency digital signal by a factor *n*. The factor *n* is a measure of the degree of approximation of the resulting sinusoidal waveform. More specifically, *n* is the ratio of the frequency of the low frequency digital signal to the frequency of the resulting low frequency sinusoidal waveform.

The output signal of divide-by-*n* circuit 200 is fed into the signal input of shift register 250 which delays the output signal by an amount depending upon the frequency of a clocking signal. Shift register 250 is clocked or controlled by the pulses of the low frequency digital signal provided on output lead 51 of divider 50. The effect of the clocking pulses is to cause shift register 250 to delay the signal produced by divide-by-*n* circuit 200 by an interval equal to the pulse repetition period of the clocking signal. The output of divide-by-*n* circuit 200 and the delayed replica of the output of circuit 200 are then coupled from circuit 200 and shift register 250 on leads 201 and 251, respectively, to a summing circuit 10. Plural resistors are advantageously included in circuit 10 for connecting respective input leads to a common output 11. There the two signals are combined in equal proportions to effect an approximation of a sinusoidal tone having a frequency equal to the frequency of the two component signals.

Figure 2:
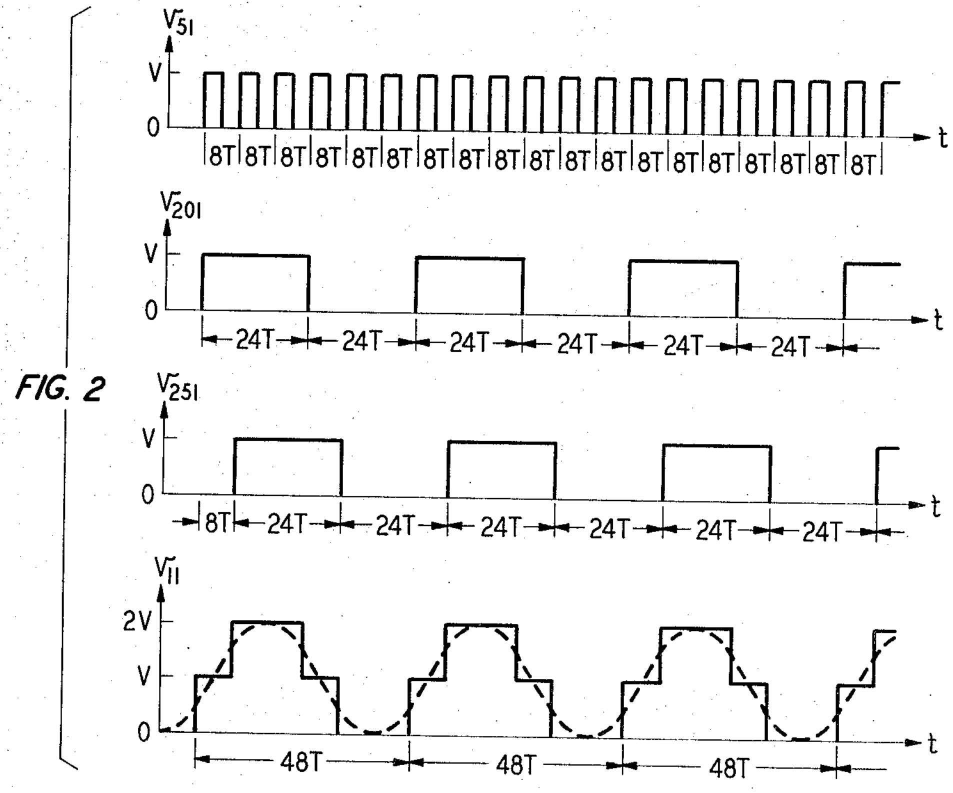
FIG. 2 illustrates waveforms provided by the circuit shown in FIG. 1.

An example of a sinusoidal tone synthesized as described above is shown in FIG. 2. $v_{201}$ and $v_{251}$ represent amplitude-versus-time plots of the components coupled to summing circuit 10 on leads 201 and 251 from divide-by-*n* circuit 200 and shift register 250, respectively. $v_{11}$ represents an amplitude-versus-time plot of the sum of these components as it would appear on output 11 of summing circuit 10 in the absence of other inputs to that circuit; and $v_{51}$ represents a similar plot of the digital signal coupled to divide-by-*n* circuit 200 and shift register 250 on output lead 51. It should be apparent from these plots that the factor *n* equals six for the waveforms shown in FIG. 2. It should be further apparent that *n* can also be defined as the number of "phases" of the resulting synthesized waveform $v_{11}$, or, equivalently, the number of pulses which are produced at output 51 of divider 50 per cycle of the resulting synthesized waveform $v_{11}$. *n* equals six for the waveforms illustrated in FIG. 2 because there are six clocking pulses ($v_{51}$) associated with each cycle of the synthesized waveform $v_{11}$. For illustrative purposes, each phase of the resulting waveform $v_{11}$ has been divided into equal intervals of 8T, which also happens to be the repetition period of the digital clocking signal $v_{51}$. T is the period of master clock circuit 700 and is a common factor in all of the frequencies generated by the tone generating circuit. The reason for expressing the period of digital clocking signal $v_{51}$ in terms of the interval T will become apparent from the following description of the invention.

In like fashion, an approximation of a high frequency sinusoidal tone is simultaneously formed in summing circuit 10 from the shifted and unshifted components which are coupled to the summing circuit on leads 401 and 501 by divide-by-*n* circuit 400 and shift register 500, respectively. Circuit 400 and register 500 are advantageously of the same types as circuit 200 and register 250, respectively. Divide-by-*n* circuit 400 also functions to divide the frequency of the digital pulses provided on output lead 71 of divider 70. The two resulting approximations of high and low frequency sinusoidal tones, which, when combined, represent a particular key on keyboard 100, are then coupled from output 11 of the summing circuit either to filter network for further waveform shaping or directly into the station loop for transmission to the central office.

Figure 3:
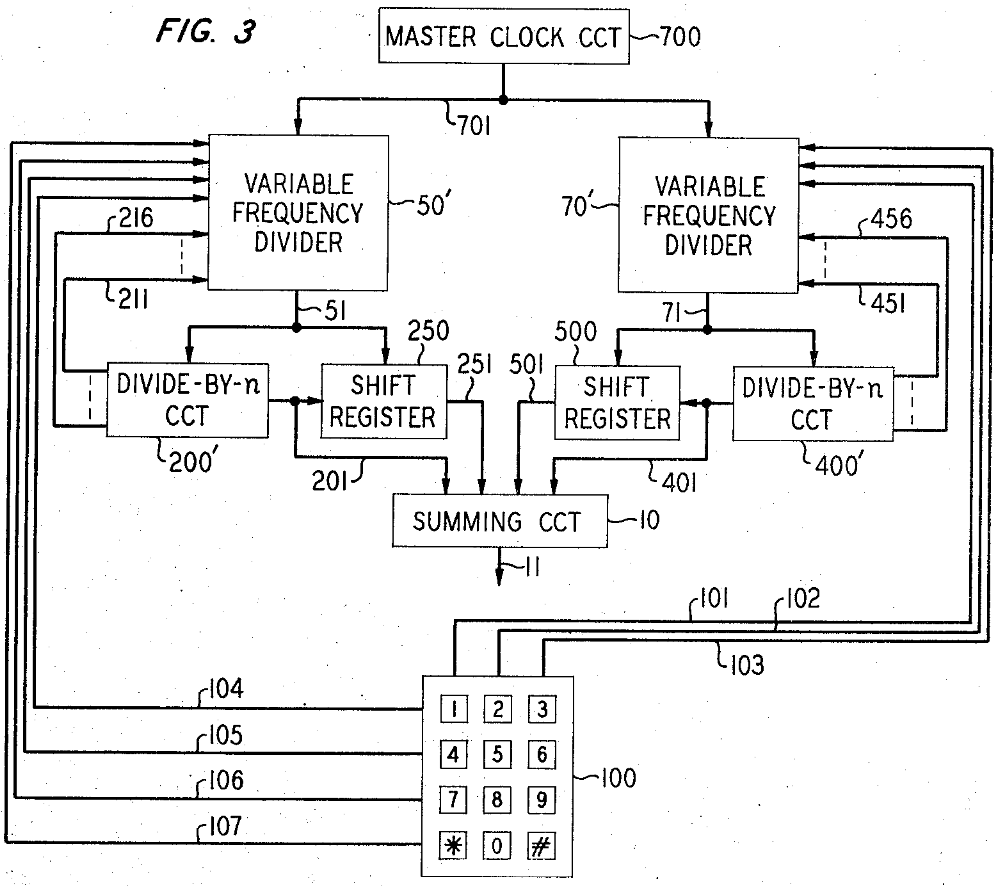
FIG. 3 illustrates an embodiment of the tone generating circuit which has the capacity of varying the frequencies of the digital components which comprise the synthesized waveform.

A significant improvement in the circuit, which enables reduction by a factor of *n* in the master clock frequency required for voice frequency signaling, is achieved by modifying divide-by-*n* circuits 200 and 400 and variable frequency dividers 50 and 70 to keep track of or to count the phase intervals of the resulting waveforms as they are being generated. An embodiment of the tone generating circuit featuring modified variable frequency dividers 50' and 70' and divide-by-*n* circuits 200' and 400' is shown in FIG. 3.

Conventional divide-by-*n* circuits of the type suitable for circuits 200' and 400' have the inherent capacity to provide the modulo-*n* counting function. For instance, in a circuit comprised of *n* serially connected shift register stages, outputs from each of the stages are utilized to provide a "1 out of *n*" code word which indicates the number (up to *n*) of pulses which have been fed in sequence into the circuit. After each such sequence of *n* pulses, the divide-by-*n* circuit generates an output pulse having a pulse repetition period which is *n* times that of the input pulses. The circuit then recycles itself and begins to count to *n* again. As a result, the outputs of the *n* stages of the circuit are used to provide an instant indication of the number of pulses which have been fed into the circuit during each cycle of the resulting sinusoidal waveform.

As mentioned above, each of the pulses fed into divide-by-*n* circuits 200' and 400' corresponds to a particular phase of one of the resulting sinusoidal waveforms. The *n* outputs of the shift register stages comprising each divide-by-*n* circuit therefore provide a complete indication of the phase of the resulting sinusoidal waveform which is being generated by any given instant of time. The phase information is used, along with the frequency information provided on the column leads 101–103 and row leads 104–107, to control the amount the master clock frequency is divided in the respective variable frequency dividers over the course of each cycle of the synthesized waveforms. This concept is implemented by making the frequencies of the digital clocking signals, which are provided at the outputs of the variable frequency dividers, dependent at any given instant upon the particular phases and frequencies of the sinusoidal tones which are being synthesized at that instant. In other words, the pulse repetition periods, and correspondingly the frequencies, of the digital clocking signals comprising each cycle of the synthesized waveforms, are varied in predetermined ordered sequences, which are determined at any given instant by the phase and the frequency of the waveforms.

Figure 4:
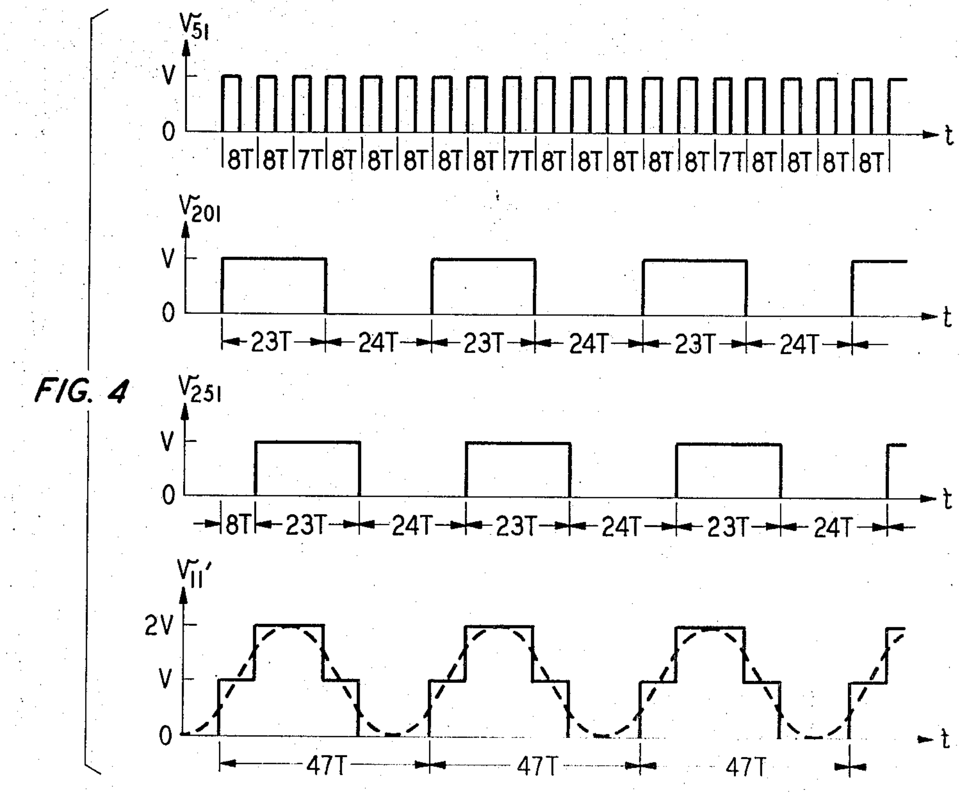
FIG. 4 illustrates waveforms provided by the circuit shown in FIG. 3.

For example, considering the waveform shown in FIG. 4, where *n* equals six, divide-by-*n* circuit 200' is configured to count the pulses of the digital clocking signal produced on output lead 51 of variable frequency divider 50'. As these pulses are being generated, divide-by-*n* circuit 200' sends signals on leads 211–216 (only two of which are shown) to variable frequency divider 50' indicating the number of pulses which have been coupled to divide-by-*n* circuit 200' during the particular cycle of the resulting waveform which is being approximated at that instant. This information is utilized by variable frequency divider 50', along with the basic frequency information provided on row leads 104–107, to control the pulse repetition period or occurrence time of the next pulse which is to be generated by the variable frequency divider. For instance, in generating the waveform $v_{11}'$, which is shown in FIG. 4 and which is a component of the total signal at output 11, divide-by-*n* circuit 200' sends a sequence of six "1 out of 6" code words on leads 211–216 to variable frequency divider 50' indicating phase numbers in each cycle. Those code word signals are employed by logic, to be described hereinafter, to cause the pulses of clocking signal $v_{51}$ to have repetition periods of 8T during the first, second, and fourth through sixth phases of each cycle of the resulting waveform $v_{11}$ and to cause the clocking pulse generated during the third phase of each cycle of the resulting waveform $v_{11}'$ to have a pulse repetition period of 7T. This enables each cycle of the resulting waveform $v_{11}'$ shown in FIG. 4 to have a period of 47T, rather than a period of 48T, as has the resulting waveform $v_{11}$, shown in FIG. 2, which the waveform $v_{11}'$ would otherwise have if all six pulses had repetition periods of 8T.

Figure 5:
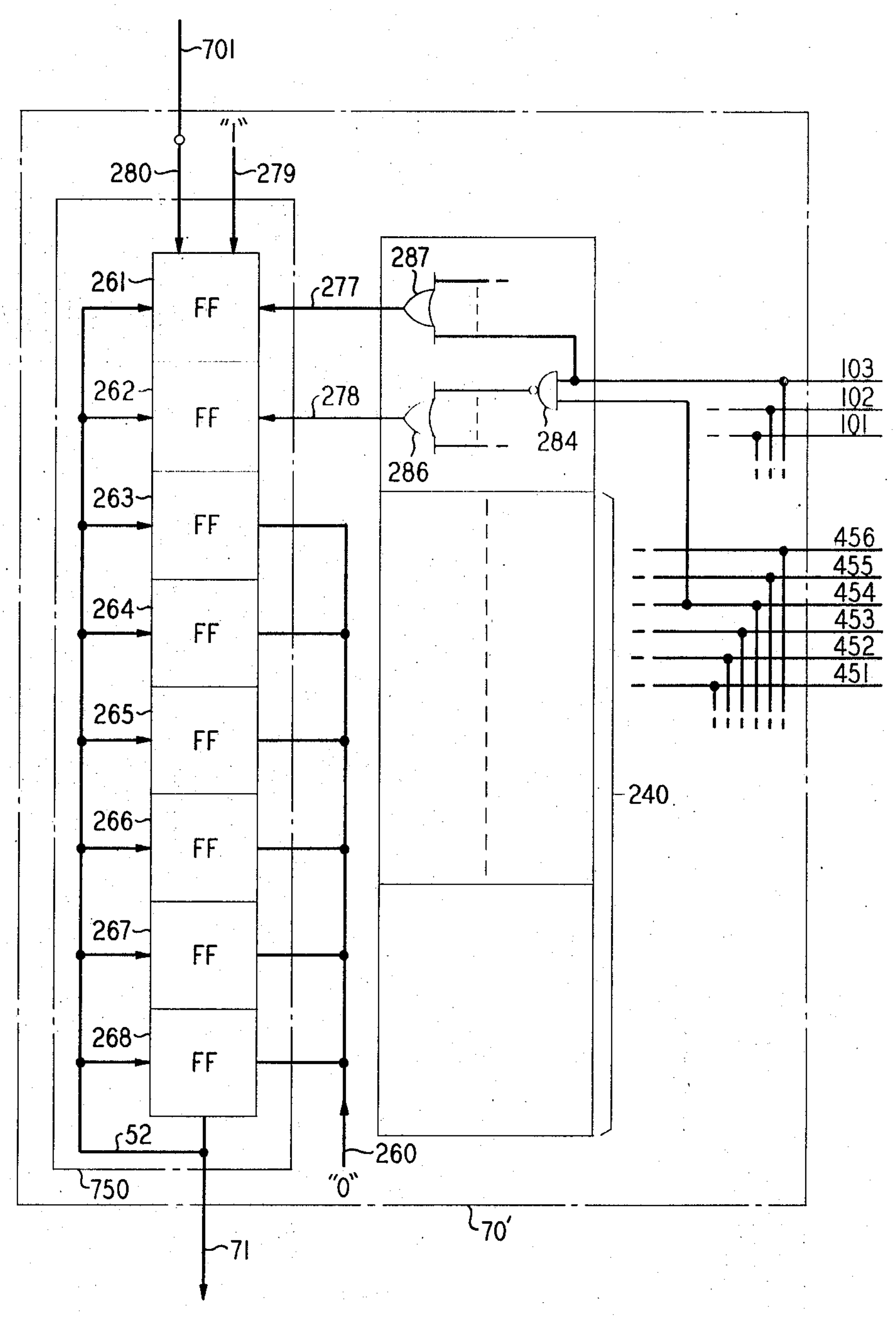
FIG. 5 depicts an illustrative method of implementing the variable frequency dividers of the circuit shown in FIG. 3.

One straightforward way of implementing variable frequency divider 70' to generate an illustrative sequence of pulses having repetition periods of 7T and 8T is shown in FIG. 5. A synchronous parallel-serial input shift register 750 of the type shown on page 57 of *RCA Solid State Databook Series, COS/MOS Digital Integrated Circuits* (1972) is utilized as the principal element of variable frequency divider 70'. Shift register 750 is comprised of eight serially connected flip-flops 261–268. The clock inputs of the flip-flops, represented by lead 280, are commonly connected via lead 701 to master clock circuit 700; and serial data input 279 of shift register 261 is connected to logic circuitry (not shown) which provides a constant binary 1, e.g., a wired voltage level that is available when the illustrated tone generating equipment is operating. The parallel data inputs of flip-flops 263–268 are connected via lead 260 to similar logic circuitry (not shown) which provides a constant binary 0, e.g., another wired voltage level. The parallel data input of flip-flop 261 is connected via lead 277 to the output of OR gate 287, which produces a binary 1 whenever column lead 103 is activated. Similarly, the parallel data input of flip-flop 262 is connected via lead 278 to the output of OR gate 286, which produces a binary 0 whenever a binary 0 is produced at the output of NAND gate 284, into which leads 103 and 454 are coupled.

Finally, lead 52 is connected between the data output of flip-flop 268 and the "parallel-serial control input" of flip-flops 261–268. Whenever a binary 1 is generated at the data output of flip-flop 268 the data at the parallel data inputs of flip-flops 261–268 are fed into the flip-flops. Otherwise, the binary 1 provided on lead 279 is synchronously propagated along the string of flip-flops.

Assuming that the master clock pulses have a period T, pulses having a repetition period of 8T are generated whenever leads 454 and 103 are activated, and pulses having a repetition period of 7T are generated whenever any one of leads 451–453 or 455–456 and lead 103 are activated. When a pulse having a repetition period of 7T is to be generated, binary 1's are coupled into the parallel data inputs of flip-flops 261 and 262, respectively; and binary 0's are fed into the parallel data inputs of flip-flops 263–268 in response to the first master clock pulse which is coupled to the register on leads 701 and 280. During the second through sixth master clock pulses, a sequence of binary 1's propagates along the flip-flops towards flip-flop 268. When the seventh master clock pulse in the sequence occurs, a pulse having a repetition period of 7T is generated at the output of flip-flop 268 and is coupled to leads 71 and 52. The same pulse is coupled back on lead 52 to the "parallel-serial control input" of flip-flops 261–268.

Generally speaking, if a pulse having a repetition period of 7T is to be generated, binary 1's are coupled into the parallel data inputs of flip-flops 261 and 262 and binary 0's into the parallel data inputs of flip-flops 263–268. However, if a pulse having a repetition period of 8T is to be generated, binary 0's are fed into the parallel data inputs of flip-flops 262–268 and a binary 1 is fed into the parallel data input of flip-flop 261. As a result, the pulse provided at the output of flip-flop 268 has a period of 8T, rather than 7T, because the pulse takes an extra master clock period T to propagate through the shift register.

More specific details of the shifting process and the supporting logic circuitry will be apparent to one skilled in the art upon examination of the shift register depicted in the RCA databook referred to above. The general logical algorithm and design technique described above is extended to additional similar sets of logical circuitry 240 (not specifically shown) to provide variable frequency dividers 50' and 70'.

These additional sets of logic 240, which are similar to NAND gate 284 and OR gates 286 and 287, are used in conjunction with leads 101, 102, 451–453, 455, 456 to control different stages of an enlarged form of register 750 (not shown) for producing other sequences of multifrequency pulses necessary for proper telephone dialing operations.

In practice, the general concept of feeding back phase information to the variable frequency dividers has been applied still further by further modifying the divide-by-*n* circuits to provide the modulo-2*n* counting function where *n* is again the number of phases per cycle of the resulting sinusoidal waveform. This modification enables the circuit to keep track of the instantaneous phase of each two adjacent cycles of the resulting sinusoidal waveforms. In the case where *n* equals six, such a modified divide-by-*n* circuit is capable of keeping track of or counting the twelve phases which comprise each pair of adjacent cycles of the resulting waveform. This phase information is coupled to the variable frequency divider on up to twelve control leads (not shown). As a result, the variable frequency divider, which is still of the general form shown in FIG. 5, but modified to handle the increased number of control leads from the divide-by-*n* circuit, generates predetermined sequences of twelve, rather than six, multifrequency digital components. Those components comprise two cycles of the resulting waveform.

A table illustrating the sequences of components which are used according to the modulo-2*n* method to generate the conventional, voiceband, multitone, dialing frequencies of 697, 770, 852, and 941 Hz (low frequency group) and 1209, 1336 and 1477 Hz (high frequency group) is shown in FIG. 6. As in the illustrative examples given above, the repetition periods of the clocking signal $v_{51}$ and waveform components $v_{201}$ and $v_{251}$ are expressed in terms of the interval T, which is the period of the master clock signal and a constant integral multiple of the required pulse repetition period of each clocking pulse. It is apparent from the table that components having pulse repetition periods of 7T–9T, and 11T–16T are required to synthesize the seven voiceband dialing tones indicated in the table.

It has been found that modifying the circuit to generate dialing tones in the manner described directly above enables the master clock frequency to be reduced by another factor of two with respect to the master clock frequency which is required in the circuit shown in FIG. 3. This result occurs because the circuit shown in FIG. 3 is limited to approximating sinusoidal signals having repetition periods which are integral multiples of T, such as 47T. However, with the circuit further modified to keep track of twelve phases of the resulting waveforms, it is possible to generate an approximation of a sinusoidal signal having an average repetition period which is a nonintegral multiple of T. For example, a waveform (not shown) having a repetition period of 47.5T is achieved by combining one cycle of the waveform which has a repetition period of 47T with an adjacent cycle of the waveform which has a repetition period of 48T.

This technique for lowering the minimum master clock frequency can be expressed more generally by configuring the divide-by-*n* circuits to provide both the modulo-*n* and modulo-*m·n* counting functions and by configuring the variable frequency dividers to provide predetermined sequences of *m·n* components, where *m* equals any positive integer greater than one. The direct effect of extending the lengths of the sequences according to this general technique is to lower the required frequency of the master clock signal still further by a factor of *m.* A practical limitation to the technique appears to be the fact that the physical size of the master clock circuit tends to become proportionately larger and, therefore more unwieldy, as the frequency of the master clock signal is reduced to lower and lower values. Another limitation is that the harmonic content of the synthesized waveforms becomes unacceptably large as the magnitude of the master clock frequency approaches the magnitude of the synthesized waveforms.

Although the present invention has been described in connection with particular applications and embodiments thereof, it is intended that all additional modifications, applications, and embodiments which will be apparent to those skilled in the art in light of the teachings of the invention be included within the spirit and scope of the invention.

What is claimed is:

1. In a telephone signaling circuit, 1. means for generating a master digital clock signal of a predetermined frequency,
2. first and second circuits for generating first and second digitally synthesized sinusoidal waveforms, each of said waveforms having a plurality of different phases and each of said first and second circuits comprising
   a. first means for encoding a plurality of first control signals,
   b. second means for encoding a plurality of second control signals corresponding to the different phases of the particular sinusoidal waveform generated by such circuit,
   c. means, responsive to said first and second control signals, for dividing said master clock signal into a sequence of digital components having different frequencies determined by said first and second control signals, said dividing means including (i) a variable frequency divider, responsive to said first and second control signals, which provides digital clocking pulses having corresponding frequencies that are divided down from the master clock frequency, (ii) means for counting said clocking pulses and further dividing the frequencies of said clocking pulses by a predetermined fixed factor to provide said digital components comprising the particular synthesized waveform generated by such circuit, and (iii) means, responsive to said clocking pulses, for shifting the phase of such digital components, d. means in said second encoding means for encoding the count of said clocking pulses into said second control signals, and
e. means for summing the shifted end unshifted digital components to form the particular synthesized waveform generated by such circuit, 3. said summing means of said first and second circuits being combined to provide superimposed approximations of said first and second synthesized waveforms on a common output, and
4. said first encoding means of said first and second circuits being included in a common keyboard such that the frequency of said first waveform depends upon control signals which correspond to the rows of keys on said keyboard and the frequency of said second waveform depends upon the control signals which correspond to the columns of keys on said keyboard.

2. The telephone signaling circuit in accordance with claim 1 in which each cycle of said first and second synthesized waveforms is comprised of *n* distinct phases, where *n* is a positive integer number, and said counting and dividing means in said first and second circuits further divide the frequencies of said clocking pulses by the factor *n*.

3. The telephone signaling circuit in accordance with claim 2 in which said counting and dividing means in said first and second circuits provide the modulo-*n* and the modulo-*m·n* counting function, where *m* is any positive integer number greater than one, and said means for encoding said clocking pulses in said first and second circuits include means for encoding the modulo-*m·n* count of said clocking pulses into corresponding ones of said second control signals.

4. A circuit for generating a digitally synthesized sinusoidal waveform having a repetition frequency $f_0$, comprising a. means for generating a master digital clock signal, b. means for encoding a first plurality of control signals corresponding to the frequency $f_0$ of said sinusoidal waveform,
c. means for variably dividing said master clock signal into a first sequence of digital clocking pulses having repetition frequencies determined by said first control signals and a plurality of second control signals,
d. means for (i) counting such pulses, (ii) encoding said second control signals to correspond to such count, and (iii) dividing the frequencies of such pulses by a predetermined fixed factor to form a second sequence of digital pulses,
e. means for delaying said second sequence of pulses by an interval determined by the pulses of said first sequence of pulses, and
f. means for summing said second sequence of pulses and the delayed second sequence of pulses to form said sinusoidal waveform.

5. The generating circuit in accordance with claim 3 in which (i) there are *n* pulses in said first sequence of digital pulses, where *n* is a positive integer number that corresponds to the number of phases per cycle of said synthesized waveform, (ii) said pulses in said first sequence of pulses have repetition frequencies $f_1, f_2, \ldots, f_n$, such that $1/f_1 + 1/f_2 + \ldots + 1/f_n = 1/f_0$, and (iii) said predetermined fixed factor is the factor *n*.

* * * * *